United States Patent
Yoshida et al.

(10) Patent No.: US 6,823,339 B2
(45) Date of Patent: *Nov. 23, 2004

(54) INFORMATION REFERENCE FREQUENCY COUNTING APPARATUS AND METHOD AND COMPUTER PROGRAM EMBODIED ON COMPUTER-READABLE MEDIUM FOR COUNTING REFERENCE FREQUENCY IN AN INTERACTIVE HYPERTEXT DOCUMENT REFERENCE SYSTEM

(75) Inventors: Atsushi Yoshida, Kawasaki (JP); Toyoaki Furusawa, Yokohama (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 464 days.

(21) Appl. No.: 08/982,934

(22) Filed: Dec. 1, 1997

(65) Prior Publication Data

US 2002/0002556 A1 Jan. 3, 2002

(30) Foreign Application Priority Data

Jan. 28, 1997 (JP) .............................. 9-014260

(51) Int. Cl.$^7$ .......................... G06F 17/30; G06F 15/00; G06F 15/77
(52) U.S. Cl. ............................... 707/10; 707/2; 707/5; 707/501.1; 707/501; 715/501.1; 715/500; 715/501; 709/224
(58) Field of Search .......................... 707/50, 1, 2, 10, 707/5, 501.1; 709/224; 395/200.54, 704; 715/500, 501, 501.1

(56) References Cited

U.S. PATENT DOCUMENTS

| | | | | |
|---|---|---|---|---|
| 5,542,089 A | * | 7/1996 | Lindsay et al. | 707/2 |
| 5,675,510 A | * | 10/1997 | Coffey et al. | 395/200.54 |
| 5,708,780 A | * | 1/1998 | Levergood et al. | 709/229 |
| 5,712,979 A | * | 1/1998 | Graber et al. | 709/224 |
| 5,727,129 A | * | 3/1998 | Barrett et al. | 706/10 |
| 5,751,956 A | * | 5/1998 | Kirsch | 709/203 |
| 5,812,134 A | * | 9/1998 | Pooser et al. | 345/356 |
| 5,848,407 A | * | 12/1998 | Ishikawa et al. | 707/2 |
| 5,864,854 A | * | 1/1999 | Boyle | 707/10 |
| 5,889,993 A | * | 3/1999 | Kroeger et al. | 395/704 |
| 5,892,917 A | * | 4/1999 | Myerson | 709/224 |
| 5,897,670 A | * | 4/1999 | Nielsen | 345/334 |
| 5,931,912 A | * | 8/1999 | Wu et al. | 709/224 |
| 5,933,827 A | * | 8/1999 | Cole et al. | 707/10 |
| 5,948,061 A | * | 9/1999 | Merriman et al. | 709/219 |
| 5,960,409 A | * | 9/1999 | Wexler | 705/14 |
| 5,960,429 A | * | 9/1999 | Peercy et al. | 707/5 |
| 6,018,748 A | * | 1/2000 | Smith | 707/501 |
| 6,230,196 B1 | * | 5/2001 | Guenthner et al. | 709/223 |

* cited by examiner

Primary Examiner—Vincent Millin
Assistant Examiner—Ella Colbert
(74) Attorney, Agent, or Firm—Staas & Halsey LLP (57) ABSTRACT

An information reference frequency counting apparatus, in an interactive hypertext information reference system, having a server managing hypertext information, a client processor making reference to the hypertext information while mutually communicating with the server and a count program counting and accumulating a reference frequency total of the referred hypertext information. The count program counts and accumulates a reference frequency total for each reference path of the referred hypertext information.

37 Claims, 8 Drawing Sheets

INFORMATION REFERENCE FREQUENCY COUNTING APPARATUS AND METHOD AND COMPUTER PROGRAM EMBODIED ON COMPUTER-READABLE MEDIUM FOR COUNTING REFERENCE FREQUENCY IN AN INTERACTIVE HYPERTEXT DOCUMENT REFERENCE SYSTEM

BACKGROUND OF THE INVENTION

1. Field of the Invention

The present invention relates to a technique for counting a reference frequency in an interactive hypertext information reference system and, in particular, to a technique for counting a reference frequency of referred hypertext information in detail. For example, a reference frequency may constitute a number of accesses, or hits, during a specified time interval on an HTML-formatted document, such as a web page, etc., the latter constituting the "referred hypertext information" and also being characterized herein as a "referred object".

2. Description of the Related Art

An interactive hypertext information reference system is used, for example, in product sales services, import deputizing services and the like, under a global distributed environment of the Internet, used as a network between networks, or in a common resource service of an Intranet, likewise used as a closed network.

In a case where the hypertext information constitutes various services (hereinafter, likewise referred to simply as "objects") provided by taking advantage of the Internet, etc., there is statistical data which shows the accumulating totals of reference frequencies of respective referred objects (hereinafter, referred to simply to as a "reference frequency" for each such referred object). The statistical data is important in order to make a judgment as to whether or not the providing of the service of a referred object should be continued. Therefore, ordinarily, there is provided a counter for counting and accumulating a reference frequency total, from the service start time to the current time, for each object.

Now, in order to make reference to another object from a certain object, it is usual in the Internet, etc., that a link for linking a relation between objects is established. Thus, in addition to making a judgment whether or not the service of a specified object should be continued, it is important to make a judgment as to whether or not the link established between objects should be continued on the basis of statistical data showing what object is the target object referred to, or showing what object has a high reference frequency.

To give an example, in the case where plural product information is published on many propaganda media in an electronic shopping district, if it can be known what propaganda media have the most excellent propaganda effect for respective products, it can contribute to decision-making, in taking measures for enhancing the use frequency of propaganda media having excellent propaganda effect, or in stopping the publishing of the product information as to propaganda media having low propaganda effect.

However, in a conventional interactive hypertext information reference system, since the reference frequency has been counted for each referred object, the conventional system has the problem that it can not make a judgment as to what propaganda media have the most excellent propaganda effect. Thus, conventional systems have not always been capable of deciding sales strategy, etc.

SUMMARY OF THE INVENTION

The present invention has been made in view of solving the above problems. An object of the present invention is to provide useful information on sales strategic planning by counting, in detail, the reference frequency of referred hypertext information in an interactive hypertext information reference system.

Another object of the present invention is to provide a function of counting and accumulating respective reference frequency totals, of referred hypertext information, for each of plural reference paths, thereby utmostly preventing not only a reduction in reliability but also any increase in cost of the system and without modifying the principal parts of the system.

Furthermore, another object of the present invention is to distribute media recording information reference counting programs so that a user who acquires the recording media can easily build up an information reference frequency count apparatus.

To achieve the above objects, the present invention provides an information reference frequency counting apparatus in an interactive hypertext information reference system, comprising a server for managing hypertext information, a client processor for making reference to the hypertext information while mutually communicating with the server, and a count program for counting and accumulating reference frequency totals of the referred hypertext information for each reference path thereof.

In the above description of "for each reference path of the hypertext information", the "path" is indicative of the link information between a certain hypertext information and another hypertext information. For example, if hypertext information A, B and C exist and links are mutually established between these hypertext information A, B and C, there exist six different links, i.e., A→B, A→C, B→A, B→C, C→A, C→B, and each of these links is referred to as a "path".

With the above constitution, when the client processor makes reference to hypertext information, it is possible to count and accumulate reference frequency totals of the hypertext information for each reference path. Therefore, it is possible to grasp, or determine, the reference frequency for each reference path, and which could not be grasped by merely counting and accumulating the reference frequency total for each hypertext information. In other words, it is possible to properly grasp, whether the reference frequency for each reference path is high or low. As a result, it is possible to grasp which link is significant, among plural links established between hypertext information.

Further, the present invention provides an information reference frequency counting apparatus in an interactive hypertext information reference system, comprising a server for managing hypertext information, a client processor for making reference to the hypertext information while mutually communicating with the server and including an informing program for informing, as to each reference path, the referencing frequency of the referred hypertext information, and a count program for counting and accumulating a reference frequency total of the referred hypertext information for each reference path thereof, as informed by the client processor.

With the above constitution, when the client processor makes reference to hypertext information, the client processor informs the count program of the reference path of the hypertext information. And then, the count program receives the information on the reference path and counts and accumulates the reference frequency total of the hypertext information for the respective reference path. Therefore, in order to add the function, of counting and accumulating the reference frequency total of the hypertext information for each reference path, to a conventional hypertext information reference system, the informing program may be merely included in the client processor while providing the count program in the server of the system. Thus, cost increases accompanying a system modification can be considerably suppressed. Moreover, there is no need to modify the principal parts of the system, so that the reliability of the system is not lowered.

Furthermore, the present invention provides an information reference frequency count apparatus in an interactive hypertext information reference system, comprising a server for managing hypertext information and responding to a reference request, and a count program for counting and accumulating a respective reference frequency total of referred hypertext information for each reference path of the referred hypertext information.

With the above constitution, when a reference request of hypertext information is sent to the server, the respective, accumulated reference frequency totals can be counted for each of plural reference paths of the hypertext information. Therefore, it is possible to grasp the reference frequency for each reference path which could not be grasped by merely counting and accumulating the reference frequency total for each hypertext information. In other words, it is possible to properly grasp whether the reference frequency for each reference path is high or low. As a result, it is possible to grasp which link is significant, among plural links established between hypertext information.

Besides, the present invention provides an information reference frequency counting apparatus in an interactive hypertext information reference system, comprising a client processor for making reference to hypertext information with respect to a data base storing the hypertext information, including an informing program for informing a reference path of the referred hypertext information and a count program for counting and accumulating the reference frequency total of the referred hypertext information for each reference path thereof, on the basis of the reference path informed by the client processor.

With the above constitution, when the client processor makes reference to hypertext information with respect to a data base, the client processor informs the count program of a reference path of the hypertext information. Then, the count program, receiving the information on the reference path, counting and accumulating the reference frequency total of the hypertext information for each reference path. Therefore, in order to add a function of counting and accumulating a reference frequency total of the hypertext information for each reference path to the conventional hypertext information reference system, the informing program may be merely included in the client processor while providing the count program in the system. Thus, cost increases accompanying the required system modification can be considerably suppressed. Moreover, there is no need to modify the principal parts of the system; thus, the reliability of the system is not lowered.

In addition to the above constitution, the count program may count respective accumulating reference frequency totals of given hypertext information for plural predetermined time intervals, of a predetermined number of such time intervals in a time series, or sequence.

With the above constitution, the reference frequency for each reference path of hypertext information is acquired in time series with a predetermined number; therefore, it is possible to make a judgment as to whether there is a tendency for the reference frequency for each reference path to increase or decrease. Thus, it is possible to more suitably make a judgment as to which reference path is significant. For example, if the reference frequency of a certain reference path has a decreasing tendency, access to this reference path, that is, the specified link of hypertext information, is stopped, so that a cost reduction can be achieved.

Moreover, in addition to the above constitution, a count condition setting program may set count conditions including, at least, a predetermined duration of the time interval and a predetermined number of such time intervals. In this case, the count condition setting program includes a selection program. The selection program may be a program for, when setting count conditions, selecting the count conditions as being common to the apparatus, as being independent for each hypertext information, or as being independent for each reference path of the hypertext information.

With the above constitution, the count conditions of each hypertext information are variously selected by the selection program, so that detailed count conditions can be set. Therefore, a user who utilizes the information frequency counting apparatus can acquire the desired statistical data.

Also, the informing program may be a program which is transferred, together with the referred hypertext information, when the client processor makes reference to the hypertext information or a program previously incorporated in the client processor.

With the above constitution, the informing program is a program which is transferred together with the referred hypertext information when the client processor makes reference to the hypertext information or a program which was previously incorporated in the client processor. Thus, in order to add the function of counting and accumulating the reference frequency total for each reference path of hypertext information to the conventional system, the client processor needs no modification or only very little modification. In particular, if many client processors make reference to hypertext information with respect to one server, cost increases accompanying the required system modification can be considerably suppressed.

Further, the present invention provides an information reference frequency counting method in an interactive hypertext information reference system, comprising a management process for managing hypertext information, a reference process for making reference to the hypertext information while mutually communicating with the management process and including an informing process for informing a reference path of the referred hypertext information, and a count process for counting and accumulating a reference frequency total of the referred hypertext information for each reference path thereof, on the basis of the reference path informed by the reference process.

With the above constitution, in the reference process, when making reference to hypertext information in the reference process, the information on the reference path of hypertext information is sent to the count process. And then, in the count process receiving the reference path information, the accumulating reference frequency totals, of hypertext information, are coupled for the respective reference paths. Therefore, in order to add the function of counting and accumulating reference frequency totals, of hypertext information, to the process of a conventional system, the informing process may be merely added to the reference process while the count process is being provided. Therefore, cost increases accompanying a required system modification can be considerably suppressed. Moreover, there is no need to modify principal parts of the system; thus, the reliability of the system is not lowered.

In this case, the count process may have a constitution for counting and accumulating reference frequency totals, of the hypertext information, for each of plural predetermined time intervals of a predetermined number of successive such time intervals in time series, like the aforesaid information reference frequency count apparatus of the present invention.

In addition to the above constitution, a count condition setting process may set count conditions including, at least, a predetermined time and a predetermined number.

Moreover, in addition to the above constitution, a selection process may select, when setting count conditions, the count conditions as being common to the method, as being independent for each hypertext information, or as being independent for each reference path of the hypertext information.

Besides, the informing process may be a program which is transferred, together with the referred hypertext information, when the reference process makes reference to the hypertext information or a program which was previously incorporated in the reference process.

Furthermore, the present invention provides a computer program embodied on computer-readable medium for counting reference frequency in an interactive hypertext information reference system, comprising a server function for managing hypertext information, a client function for making reference to the hypertext information while mutually communicating with the server function, and a count function for counting and accumulating a reference frequency total of the referred hypertext information for each reference path thereof.

As used herein, "medium" or "media" means one or more items which are capable of securely recording various information and being securely taken out as the need arises. More specifically, a "medium" may be any of paper cards (punch cards), paper tapes, magnetic tapes, magnetic drums, IC cards, etc.

With the above constitution, there are provided media recording programs for realizing a server function for managing hypertext information, a client function for making reference to the hypertext information, and a count function for counting and accumulating reference frequency totals of the referred hypertext information. Therefore, with use of media recording the aforesaid programs, it is possible to provide the aforesaid various functions, for many servers and client processors.

Further, the present invention provides a computer program embodied in a computer-readable medium for counting a reference frequency in an interactive hypertext information reference system, comprising a server function for managing hypertext information, a client function for making reference to the hypertext information while mutually communicating with the server function and including an informing function for informing a reference path of the referred hypertext information, and a count function for counting and accumulating reference frequency totals of the referred hypertext information for each of plural reference paths thereof, respectively, on the basis of the reference paths informed by the client function.

With the above constitution, there are provided medium recording programs for realizing a server function for managing hypertext information, a client function for making reference to the hypertext information, a count function for counting and accumulating reference frequency totals of the referred hypertext information, and an informing function included in the client function and informing the count function of each reference path of the referred hypertext information. Therefore, with use of media recording the aforesaid programs, it is possible to provide the aforesaid various functions for many servers and client processors.

In this case, the count function may have a constitution for counting and accumulating reference frequency totals of the hypertext information for each of plural, predetermined time intervals, of a predetermined number of such intervals in time series, like the information reference frequency counting apparatus and method according to the present invention.

In addition to the above constitution, a count condition setting function may set count conditions including, at least, a predetermined duration for each time interval and a predetermined number of such intervals.

Moreover, in addition to the above constitution, a selection function may select, when setting count conditions, the count conditions as being common to the program for counting the reference frequency, as being independent for each hypertext information, or as being independent for each reference path of the hypertext information.

Besides, the informing function may be a program which is transferred, together with the referred hypertext information, when the client function makes reference to the hypertext information or a program which was previously incorporated in the client function.

Other objects and features of the present invention will become obvious from the following description of the embodiment in connection with the accompanying drawings.

BRIEF DESCRIPTION OF THE DRAWINGS

FIGS. 3(a) and 3(b) show an example of the reference frequency count program according to an embodiment of the present invention and, specifically.

DESCRIPTION OF THE PREFERRED EMBODIMENTS

The embodiments of the present invention will be described next with reference to the related figures.

Figure 1:
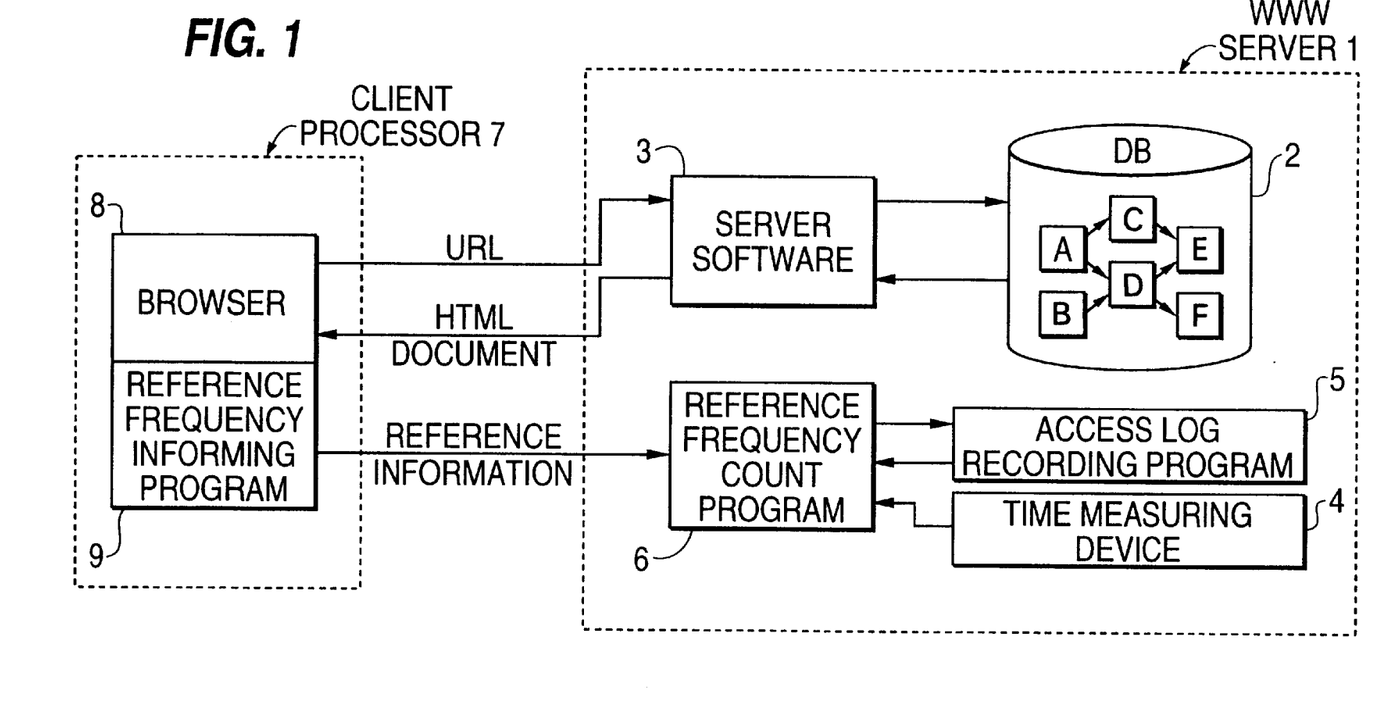
FIG. 1 is a system configuration diagram of an information reference frequency counting apparatus according to an embodiment of the present invention.

FIG. 1 shows a system configuration of one embodiment of an apparatus of the present invention for counting the information reference frequency in an Internet arrangement comprising a WWW (World Wide Web) server and a browser on the client processor side. Here, each of the WWW server and the client processor is a computer which includes at least a CPU and a memory and executes programs stored in memory.

Objects A to F provided by a WWW server 1 are documents described, or formatted, in Hyper Text Markup Language (hereinafter, referred to simply as "HTML documents", or "objects"). In order to make reference from one object to another object, there are established links (A→C, A→D, B→D, C→E, D→E, D→F) for linking a relation between objects. Also, the HTML documents, indicative of objects A to F, are stored in an auxiliary memory 2 such as a hard disk constituting the WWW server 1, and reference, update and the like, with respect to these HTML documents, are executed via server software 3.

Moreover, the WWW server 1 is provided with a time measuring device (i.e., a "program" or a "clock") 4 which measures current date and time, an access log recording program 5 which records time when an object has been referred, a user and a reference path (e.g., A→C), and a reference frequency count program (count program) 6 which counts an accumulating reference frequency total of a referred object for each link. The access log recording program 5 is built up in a memory such as a RAM (not shown) constituting the WWW server 1, or in an auxiliary memory such as a hard disk, for example.

On the other hand, the browser 8, on the side of the client processor 7, is additionally provided with a reference information informing program (informing program) 9 which informs the reference frequency count program 6 of reference information representing a user name (client name), a name identifying a currently displayed object and a name identifying the next reference object (that is, an "object to be referred"). The reference information informing program 9 is built up by programs such as "Java (trademark) Applet", Active X control, forms incorporated in HTML documents, etc.

Figure 2:
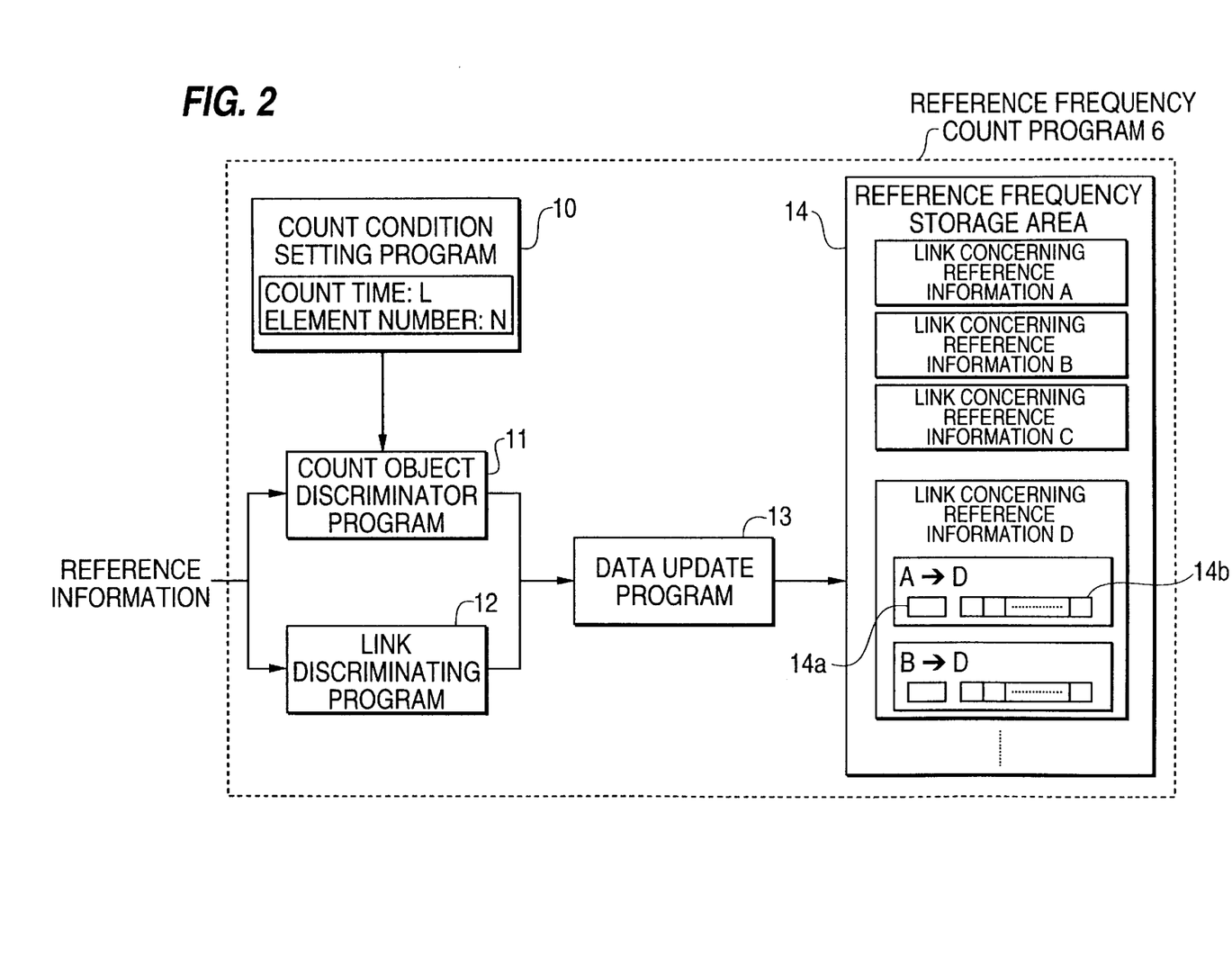
FIG. 2 is a block diagram showing the details of a reference frequency count program according to the embodiment of the present invention.

As shown in FIG. 2, the reference frequency count program 6, constituting the WWW server 1, comprises a count condition setting program 10 for setting count conditions (later described in detail), a count object discriminator program 11 for discriminating an object to be counted on the basis of the set count conditions and reference information informed from (i.e., supplied by) the reference information informing program 9, a link discriminating program 12 for discriminating a link on the basis of the informed reference information, a data update program 13 for updating the accumulating reference frequency total of the object on the basis of the count object and its link, and a reference frequency storage area 14 including an accumulating total 14a of the reference frequency from the creation of each link and an array 14b for recording the latest reference frequency for each count time interval with a predetermined number.

The aforesaid count condition setting program 10 stores, as count conditions for the entirety of the WWW server 1, a count time L specifying a predetermined count time interval and an element number N specifying how many reference frequency count time intervals should be recorded. Therefore, the array 14b of the reference frequency storage area 14 is an array having N elements. Moreover, the count object discriminating program 11 discriminates which element should be incremented in the array 14b of the reference frequency storage area 14, on the basis of reference information and count conditions. The link discriminating program 12 discriminates a count object link on the basis of reference information. In this case, the aforesaid count time L and element number N may be set as common data for the entirety of WWW server 1 and, also, may be set for each object or for each link.

The server software 3 and the browser 8 are connected to each other via a communication protocol which is called an "HTTP" (Hyper Text Transfer Protocol). The server software 3 transfers HTML documents to the browser 8 in response to the Uniform Resource Locator sent from the browser 8. The Uniform Resource Locator is a descriptive method for specifying a protocol used in information resource access and information address, and is hereinafter referred to simply as "URL". When an object is referred, the reference information informing program 9, added to the browser 8 informs the reference frequency count program 6 of the related reference information and, then, the reference frequency count program 6 receives the reference information and executes an increment of the reference frequency for each link.

Figure 3A:
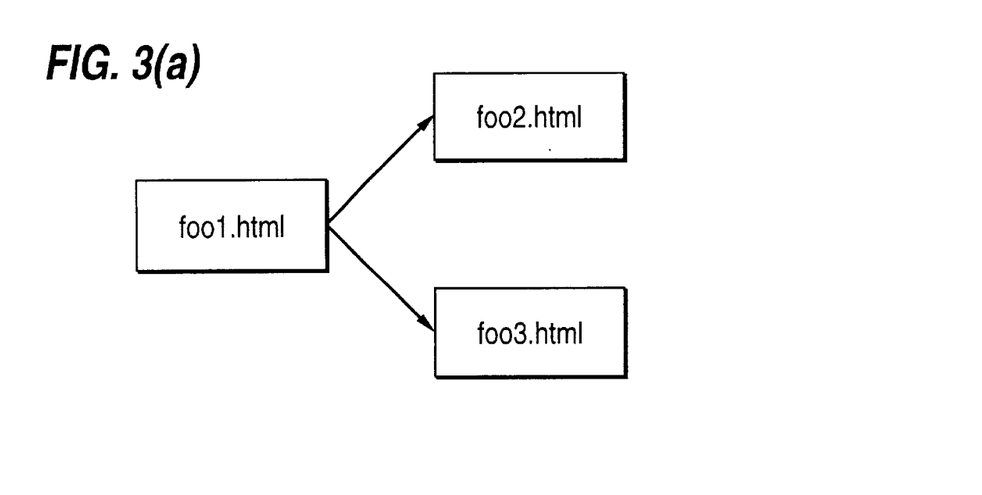
FIG. 3(a) shows an object linked state and FIG. 3(b) shows an example of data previously set.

The count condition setting section 10 and the reference frequency storage area 14 of the reference frequency count program 6 are now described. As shown in FIG. 3(*a*), there are prepared HTML documents (foo1.html, foo2.html, foo3.html) used as objects; further, a first link foo1.html→foo2.html and a second link foo1.html→foo3.html are established, as a premise.

Figure 3B:
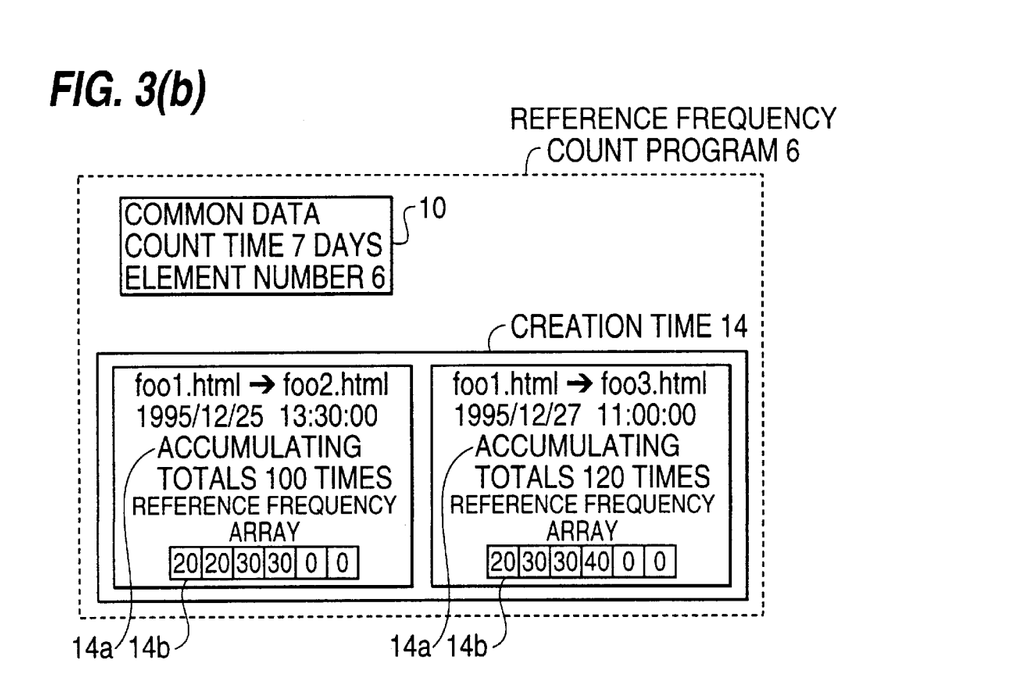

As shown in FIG. 3(*b*), in the count condition setting section 10, there are previously set seven (7) days (one week) as the count time and six (6) as the element number. More specifically, the respective reference frequency counts for seven days (one week) are successively stored in a respective element of the array 14b having six elements; thus, the reference frequency for the last forty-two days (six weeks) is recorded in the array 14b. On the other hand, in the reference frequency storage area 14, there are set a link creation time, the accumulating total 14a of the reference frequency from the link creation time, and the array 14b having six elements, illustratively, for link foo1.html→foo2.html and link foo1.html→foo3.html.

Figure 4:
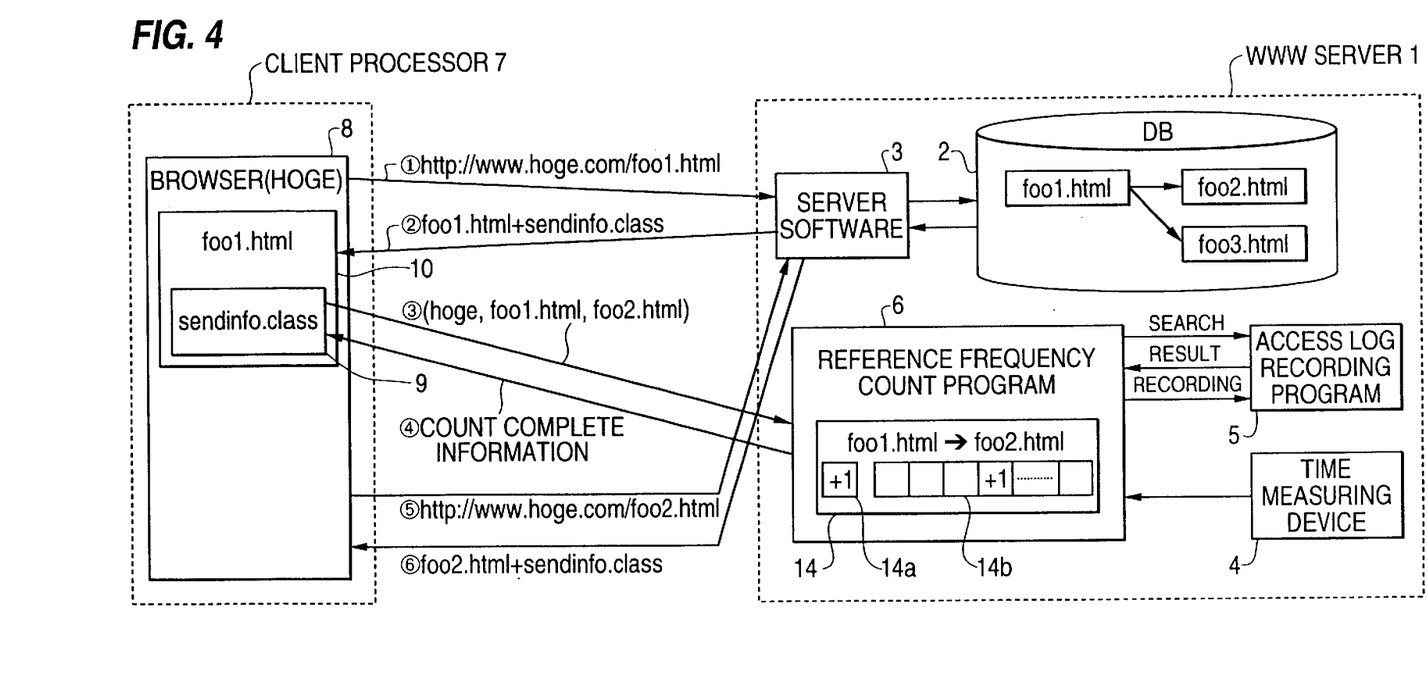
FIG. 4 is a view showing a process flow for counting the information reference frequency.

Next, a processing content on the WWW server 1 side and the client processor 7 side will be described below with reference to FIG. 4, showing a process flow and the related flowcharts shown in FIGS. 5 to 9.

First, an outline of the counting process of the reference frequency of an HTML document will be described below with reference to FIG. 4, showing a process flow. FIG. 4 shows a processing flow when making reference to the object foo2.html from the object foo1.html in the browser 8.

A URL (http://www.hoge.com/foo1.html), specifying an HTML document to be referred, is sent from the browser (hoge) 8 on the client processor 7 side to the server software 3 on the WWW server 1 side (process (1)). The server software 3 searches an HTML document to be referred from the auxiliary memory 2, such as a data base storing HTML documents, in response to the sent URL. And then, the server software 3 sends back to the browser 8 the reference information informing program (sendinfo.class) 9, such as a Java Applet, for automatically sending the search result (foo1.html) 10 and reference information of the browser 8 (process (2)). When the search result and the reference information informing program 9 are sent back to the browser 8, the browser 8 displays the HTML document 10, which is the search result, while adding the reference information informing program 9 to the displayed HTML document 10. In this case, the reference information informing program 9 is not restricted to a Java Applet, and there may be used, for example, forms incorporated in the HTML document 10 sent back, Active X control, application programs previously incorporated in the browser 8, etc.

When making reference to a linking HTML document (foo2.html) from the HTML (foo1.html) displayed in the browser 8, the reference information informing program 9 sends reference information including at least user name (hoge), reference start (foo1.html) and reference destination (foo2.html), to the reference frequency count program 6 on the WWW server 1 side (process (3)). Then, the reference frequency count program 6 receives the reference information and counts the reference frequency of the HTML document, and thereafter, sends back the count completion information to the reference information informing program 9 (process (4)).

Subsequently, the browser 8 sends a URL (http://www.hoge.com/foo2.html) for specifying an HTML document (foo2.html) to be newly referred to the server software 3 (process (5)). On the other hand, the server software 3 sends back the search result (foo2.html) and the reference information informing program (sendinfo.class) to the browser 8 (process (6)). Thereafter, the aforesaid processes are repeated.

Figure 5:
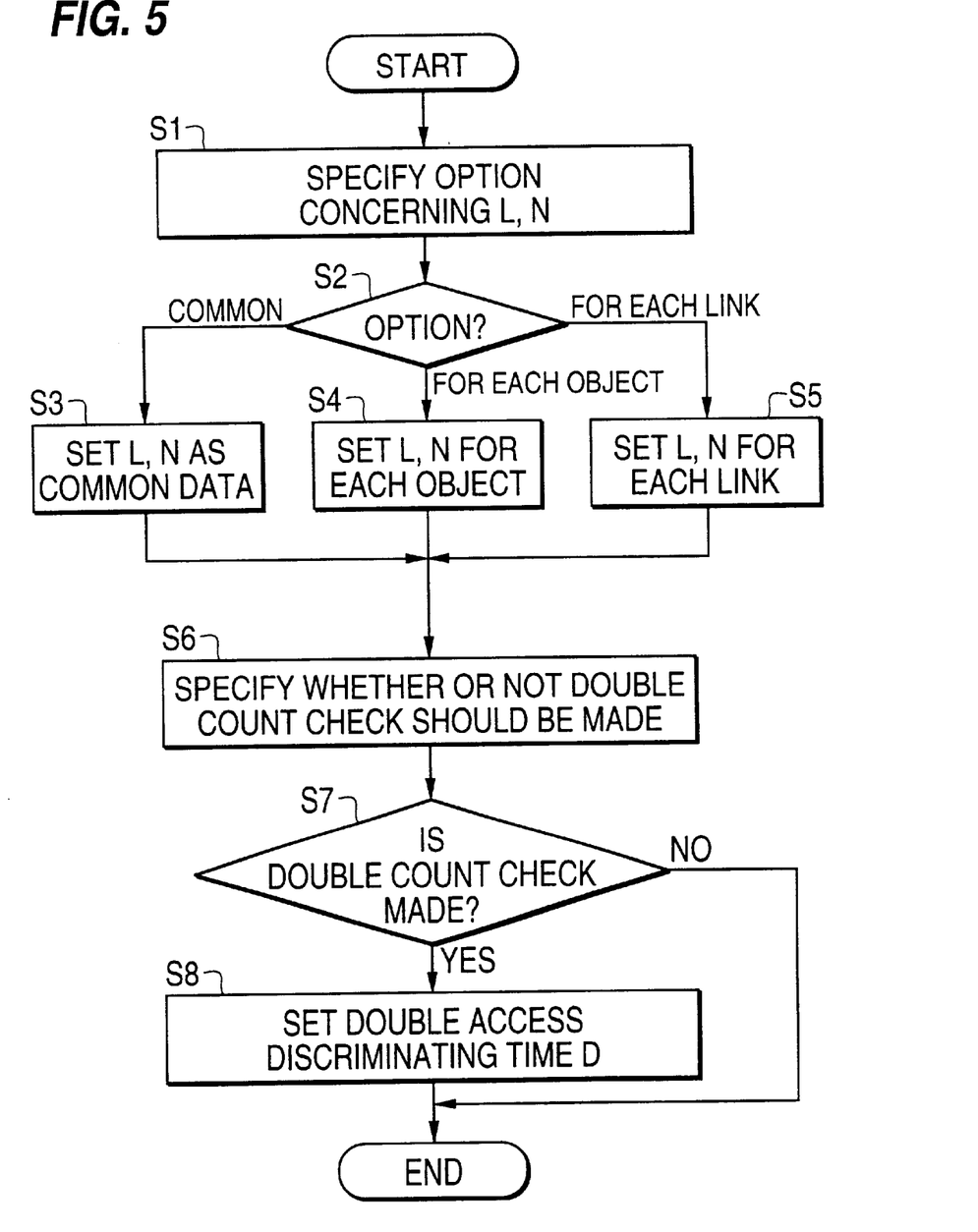
FIG. 5 is a flowchart showing an initial setting process in a WWW (World Wide Web) server.

FIG. 5 is a flowchart showing a process of various option setting for counting the reference frequency of an HTML document in the WWW server 1. This routine is carried out in initializing programs, in adding objects, and in changing options before a process for counting the reference frequency is executed.

In step 1 (abbreviated as "S1" in the figure, and so forth), an option concerning count time L and element number N, which are used as count conditions, is preset. More specifically, it is specified in step 1 whether both the count time L and the element number N are set, as the entire common data, for each object or for each link.

In step 2, branch processing is executed on the basis of the option concerning the count time L and the element number N. If these count time L and element number N are set as the entire common data (COMMON), the execution sequence proceeds to step 3; if they are set for each object (FOR EACH OBJECT), it proceeds to step 4; and if they are set for each link (FOR EACH LINK), it proceeds to step 5.

Specifically, in step 3, the count time L and the element number N are set as common data.

In step 4, the count time L and the element number N are set for each object.

In step 5, the count time L and the element number N are set for each link.

In step 6, if the identical user makes reference to the identical link, it is specified whether or not this case should be counted double, that is, whether or not a double count check should be made.

In step 7, branch processing is executed on the basis that the double count check should be made. If the double count check is made (YES), the execution sequence proceeds to step 8; on the other hand, if the double count check is not made (NO), this routine ends.

In step 8, a double access discriminating time D (which will be later described in detail) is set for reference when the double count check is executed and, then, this routine ends.

Figure 6:
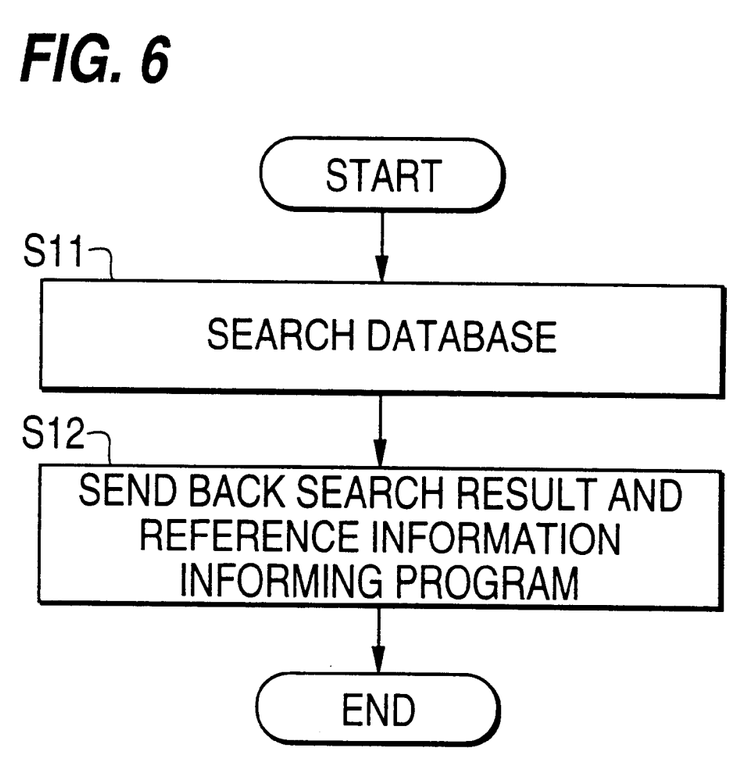
FIG. 6 is a flowchart showing processing content in server software.

FIG. 6 is a flowchart showing a process executed when a URL is sent from the browser 8, in the server software 3 of the WWW server 1. Moreover, this process is equivalent not only to process (2) and process (6) in FIG. 4, but also to a management process.

In step 11, a search of the auxiliary memory 2, such as data base, is executed on the basis of the sent URL.

In step 12, the HTML document 10, which is the search result, and the reference information informing program 9 are sent back to the browser 8.

Figure 7:
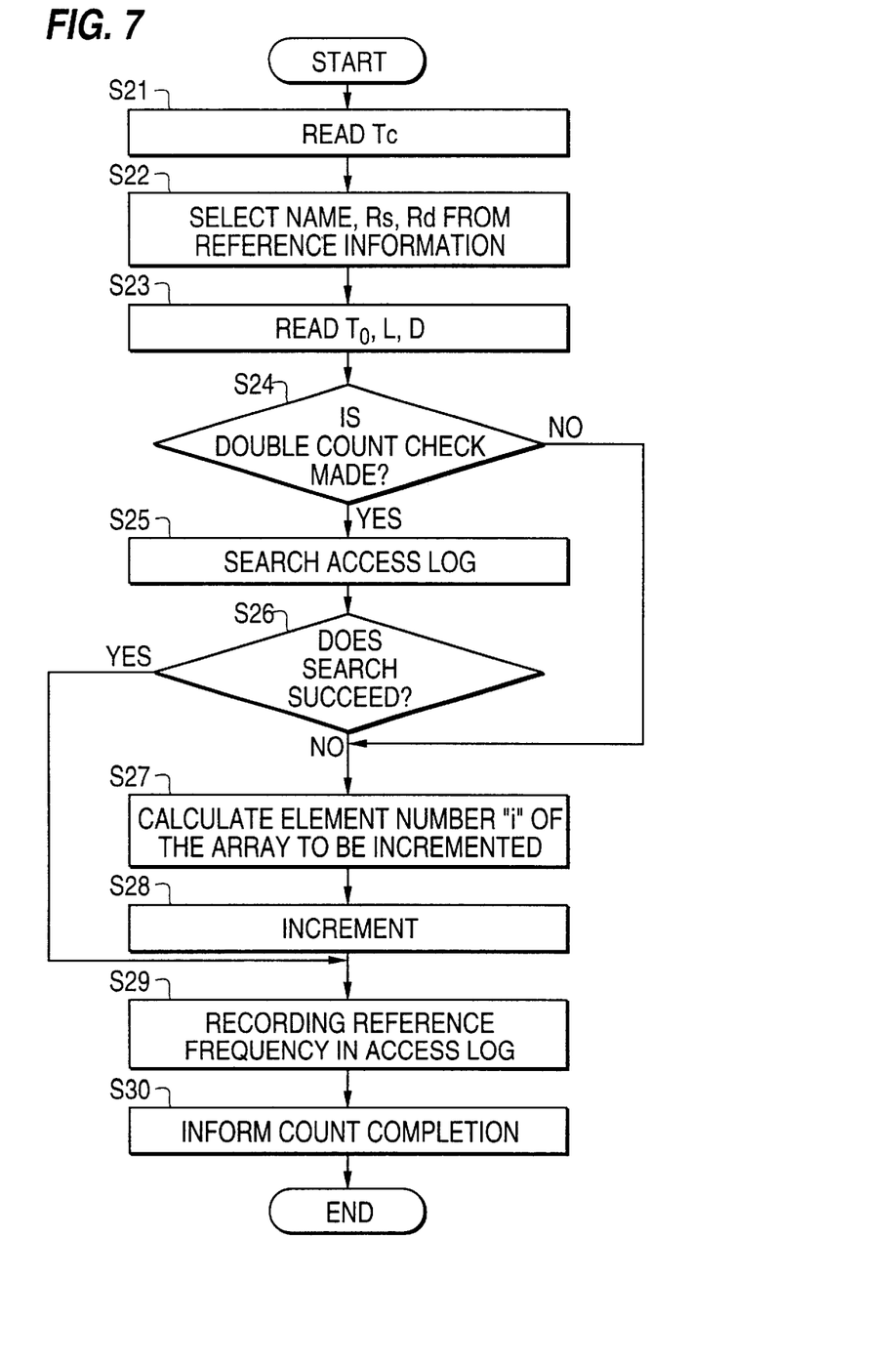
FIG. 7 is a flowchart showing processing content in a reference frequency count program.

FIG. 7 is a flowchart showing a count process executed when reference information (user name: Name; reference start: Rs; and reference destination: Rd) is provided, that is, a count request is sent from the reference information informing program 9 to the reference frequency count program 6 of the WWW server 1. Moreover, this count process is equivalent not only to a part of process (4) of FIG. 4, but also to the process and function of counting the reference frequency.

In step 21, a current time Tc is read by means of a time measuring device 4 (FIG. 4).

In step 22, the aforesaid user name: Name; reference start: Rs; and reference destination: Rd are sampled from the informed reference information.

In step 23, the creation time To of the link R (reference start Rs→reference destination Rd) in which the count request is made, count time L and double access discriminating time D, are read.

In step 24, a branch process is executed on the basis that the double count check should be made. If the double count check is made (YES), the execution sequence proceeds to step 25; on the other hand, if the double count check is not made (NO), it proceeds to step 27.

In step 25, a search as to whether or not there is a reference to the identical link (e.g., Rs→Rd) from the identical user Name within the double access discriminating time D from the current time, is executed with respect to the access log recording program 5 (FIG. 4).

In step 26, a branch process is executed on the basis of the result of whether or not a search of the access log recording program 5 succeeds (namely, in the case where there is a reference within the double access discriminating time D). If the search succeeds (YES), the execution sequence proceeds to step 29; on the other hand, if the search fails (NO), it proceeds to step 27. In this case, "the search fails" does not mean that an error occurs, but means that the search object does not exist.

In step 27, on the basis of the creation time To of the link R (Rs→Rd), the current time Tc and count time L, an element number "i" of the array 14b which increments the reference frequency is calculated from the following equation:

$$i=(Tc-To)/L$$

As in the present embodiment, in the case where the count information is recorded in time series with use of the array, if the last element in the array has been used up, there are executed the following processes, that is, a process (1) such that the element of array is shifted forward, one-by-one, and a relative equation of To=To+L is set, or a process (2) such that the count information is overwritten in the head element of the array, and the value is set to 1.

In step 28, a count object is determined on the basis of the link R (Rs→Rd) and the accumulating total count information from the creation time of the link; R is incremented while incrementing the count information represented in time series on the basis of the element number "i".

In step 29, the access log recording program 5 records data indicative of the fact that there was a reference to the link R (Rs→Rd) from the user Name at the time Tc.

In step 30, the count process completion information is sent to the reference information informing program 9.

Figure 8:
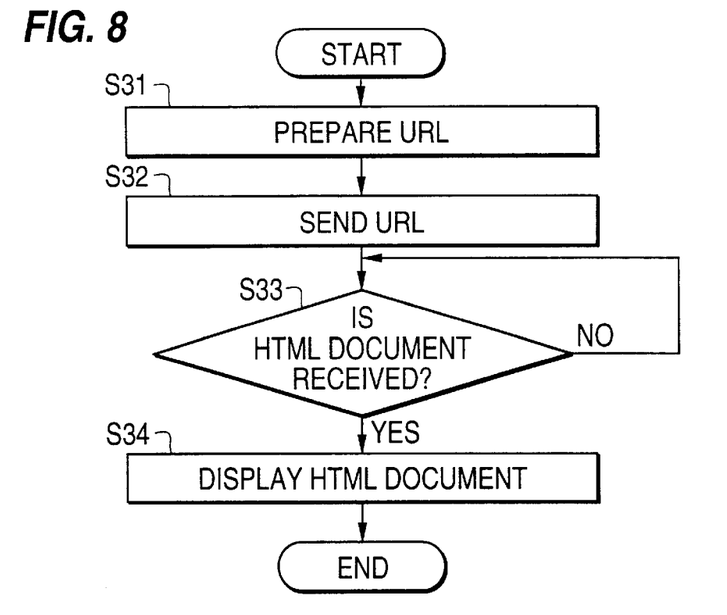
FIG. 8 is a flowchart showing an object reference processing content in a browser.

FIG. 8 is a flowchart showing an object reference process when referring an object in the browser 8. This object reference process is executed when specifying an object to display the object on the browser 8. Moreover, this process is equivalent not only to process (1) and process (5) of FIG. 4, but also to a reference process.

In step 31, there is prepared a URL for specifying a reference object.

In step 32, the prepared URL is sent to the server software 3.

In step 33, a branch process is executed on the basis of the result as to whether or not there is a return of the HTML document which is the reference object and of the reference information informing program from the server software 3. If there is a return of the HTML document (YES), the execution sequence proceeds to step 34; on the other hand, if there is no return of the HTML document (NO), it stands by. Specifically, this is a process for waiting for the return of an HTML document.

In step 34, the returned HTML document is displayed on a display device (not shown), etc., and this routine ends.

Figure 9:
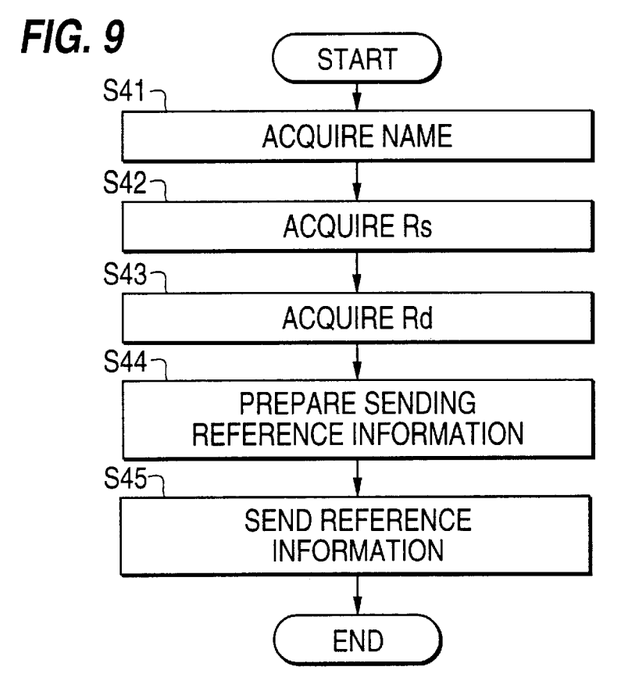
FIG. 9 is a flowchart showing processing content in a reference information informing program.

FIG. 9 is a flowchart showing a reference information informing process in which the reference information informing program 9, added to the browser 8, informs the reference frequency count program 6 on the WWW server 1 side of reference information, when another HTML document is referred from the HTML documents displayed on the browser 8. Moreover, this reference information informing process is equivalent not only to process (3) of FIG. 4, but also to a reference path informing process and function.

In step 41, a user name (Name) is acquired from the browser 8. Specifically, the user name (Name) can be acquired with use of an interface published by the browser.

In step 42, a name Rs for identifying an object from the displayed HTML document is acquired. For example, if the reference information informing program 9 is realized with use of a Java Applet, the name Rs can be acquired with use of a function prepared by JavaScript language.

In step 43, a name Rd for identifying an object which is another HTML document to be newly referred is acquired. For example, if the reference information informing program 9 is realized with use of Java Applet, the name Rd can likewise be acquired with use of a function prepared by JavaScript language.

In step 44, there is generated a 3-tuple of reference information (user name: Name, reference start: Rs, reference destination: Rd) which is sent to the reference frequency count program 6 on the WWW server 1 side.

In step 45, the reference information (Name, Rs, Rd) is sent to the reference frequency count program 6.

The information reference frequency counting apparatus executes the processes as described above. Thus, in the apparatus of the present invention, when reference to an object is made from the browser 8 of the client processor 7, the reference information informing program 9, comprising programs such as Java Applet, is transferred to the browser 8 together with the referred object from the server software 3 of the WWW server 1. And then, when reference to another object is made from the object displayed on the browser 8, the reference information informing program 9 automatically informs the reference frequency count program 6 of the related reference information, such as reference path, etc. Subsequently, the reference frequency count program 6 receives the reference information counts and accumulates the reference frequency totals, from a creation time for each object, while counting and accumulating the respective reference frequency totals for each of the successive predetermined time intervals and for each reference path (URL).

With the above constitution, according to the present invention, in order to add a function of counting the reference frequency for each reference path to the conventional interactive hypertext information reference system, a count process by the reference frequency count program 6 and a transfer process by the reference information informing program 9 may be merely added to the WWW server 1. Therefore, the client processor 7 side requires no modification and, thus, system modification can be easily achieved. In particular, in the case where many clients processors 7 are connected to one WWW server 1, system modification is required with respect to only the single WWW server 1, so that an increase in cost accompanying a modification can be considerably suppressed.

Further, according to the present invention, the reference frequency for each reference path of the object is counted in time series with a predetermined number; therefore, it is possible to make a judgment as to whether there is a tendency for the reference frequency, for each reference path, to increase or decrease. Thus, based on the above judgment, it is possible to make a judgment as to whether or not a link established between objects should be maintained.

Furthermore, according to the present invention, there is no need to modify principal parts of the system; thus, the reliability of the system is not lowered.

If programs for realizing the aforesaid functions are recorded in recording media, such as paper cards (punch cards), paper tapes, magnetic tapes, magnetic drums, IC cards, etc., the information reference count programs according to the present invention can be distributed. A user who acquires the recording media can easily build up the reference frequency counting apparatus.

Also, in the present embodiment, the reference frequency for each object is counted in real time. For example, batch processing may be collectively executed for a predetermined time on the basis of the access status of the object recorded in the access log recording program 5. Moreover, the reference frequency for each predetermined time has been represented by use of the array (matrix) as described in the embodiment. For example, the reference frequency may be successively output to files of the auxiliary memory, or may be successively output onto paper with use of a printer.

Numerous modifications and adaptations of the invention will be apparent to those of skill in the art and thus it is intended by the pending claims to cover all such modifications and adaptations that fall within the true spirit and scope of the invention.

We claim:

1. An information reference frequency counting apparatus in an interactive hypertext document reference system, comprising:

a server managing hypertext documents, each hypertext document including at least one hyperlink;

a client processor requesting a hypertext document, through a requesting program, and receiving from said server the requested hypertext document; and a count program counting and accumulating a reference total for a reference path based on the reference path including a reference start and a reference destination, concerned with an activated hyperlink of the received hypertext document, provided by an informing program at the client processor.

2. The information reference frequency counting apparatus as recited in claim 1, wherein said count program counts and accumulates reference totals of the requested hypertext document for each predetermined time interval of a series of a predetermined number of successive time intervals.

3. The information reference frequency counting apparatus as recited in claim 2, further comprising:
a count condition setting program setting count conditions including at least a predetermined duration of each time interval and a predetermined number of the successive time intervals of each series.

4. An information reference frequency counting apparatus according to claim 3, further comprising:
a selection program setting count conditions by selecting the count conditions as being common to the apparatus, as being independent for each hypertext document, or as being independent for each reference path of the requested hypertext document.

5. The information reference frequency counting apparatus as recited in claim 1, said informing program informing of the reference path, and said count program counting and accumulating a respective reference total of the requested hypertext document for each reference path, as informed by said client processor.

6. The information reference frequency counting apparatus as recited in claim 5, wherein said informing program is transferred together with the requested hypertext document when said client processor requests the received hypertext document.

7. The information reference frequency counting apparatus as recited in claim 5, wherein said informing program is previously incorporated in said client processor.

8. The information reference frequency counting apparatus as recited in claim 5, wherein said count program counts and accumulates respective reference totals for at least one reference path, of the hypertext document, for a series of successive, predetermined time intervals.

9. The information reference frequency counting apparatus as recited in claim 8, further comprising:
a count condition setting program for setting count conditions including, at least, a predetermined duration of each time interval and a predetermined number of the successive time intervals of each series.

10. An information reference frequency counting apparatus according to claim 9, further comprising:
a selection program setting count conditions by selecting the count conditions as being common to the apparatus, as being independent for each hypertext document, or as being independent for each reference path of the requested hypertext document.

11. An information reference frequency counting apparatus in an interactive hypertext document reference system, comprising:
a server managing hypertext documents, each hypertext document including at least one hyperlink, and responding to a document request by a client processor, through a requesting program, by forwarding a managed hypertext document to the client processor; and
a count program counting and accumulating a reference total, of requested hypertext documents, for a reference path based on the reference path including a reference start and a reference destination, concerned with an activated hyperlink of the forwarded hypertext document, provided by an informing program at the client processor.

12. The information reference frequency counting apparatus as recited in claim 11, wherein said count program counts and accumulates respective reference totals of the hypertext document for a series of successive predetermined time intervals.

13. An information reference frequency counting apparatus according to claim 12, further comprising:
a count condition setting program for setting count conditions including, at least, a predetermined duration of each time interval and a predetermined number of the successive time intervals of each series.

14. The information reference frequency counting apparatus as recited in claim 13, further comprising:
a selection program setting count conditions by selecting the count conditions as being common to the apparatus, as being independent for each hypertext document, or as being independent for each reference path of the requested hypertext document.

15. An information reference frequency counting apparatus in an interactive hypertext document reference system, comprising:
a client processor requesting at least one hypertext document, through a requesting program, each hypertext document including at least one hyperlink, with respect to a data base storing the hypertext documents, and including an informing program informing of a reference path including a reference start and a reference destination, concerned with an activated hyperlink of the requested hypertext document; and
a count program counting and accumulating a reference total, of the requested hypertext document, for each reference path activated, taken within the requested hypertext document, as informed by said client processor.

16. The information reference frequency counting apparatus as recited in claim 15, wherein said informing program is transferred together with the requested hypertext document when said client processor requests the hypertext document.

17. The information reference frequency counting apparatus as recited in claim 15, wherein said informing program is previously incorporated in said client processor.

18. The information reference frequency counting apparatus as recited in claim 15, wherein said count program counts and accumulates respective reference totals of the hypertext document for a series of successive, predetermined time intervals.

19. The information reference frequency counting apparatus as recited in claim 18, further comprising:
a count condition setting program for setting count conditions including, at least, a predetermined duration of each time interval and a predetermined number of the successive time intervals of each series.

20. The information reference frequency counting apparatus as recited in claim 19, further comprising:
a selection program setting count conditions by selecting the count conditions as being common to the apparatus, as being independent for each hypertext document, or as being independent for each reference path of the requested hypertext document.

21. An information reference frequency counting method in an interactive hypertext document reference system, comprising:
a management process managing hypertext documents, each hypertext document including at least one hyperlink;

requesting process requesting a hypertext document and including an informing process, separate from said requesting process, informing of a reference path including a reference start and a reference destination, concerned with an activated hyperlink of the requested hypertext document; and a count process counting and accumulating a reference total of the requested hypertext document for each reference path activated, as informed by said requesting process.

22. The information reference frequency counting method as recited in claim 21, wherein said count process counts and accumulates respective reference totals of the hypertext document for a series of successive, predetermined time intervals.

23. The information reference frequency counting method as recited in claim 22, further comprising:

a count condition setting process setting count conditions including, at least, a predetermined duration of each time interval and a predetermined number of the successive time intervals of each series.

24. The information reference frequency counting method as recited in claim 23, further comprising:

a selection process setting count conditions by selecting the count conditions as being common to the method, as being independent for each hypertext document, or as being independent for each reference path of the requested hypertext document.

25. The information reference frequency counting method as recited in claim 21, wherein said informing process is transferred together with the requested hypertext document when said requesting process requests the hypertext document.

26. The information reference frequency counting method as recited in claim 21, wherein said informing process is a program which is previously incorporated in said requesting process.

27. A computer program, embodied in a computer-readable medium, counting reference totals in an interactive hypertext document reference system, comprising:

a server function managing hypertext documents, each hypertext document including at least one hyperlink;

a client function requesting a hypertext document, through a requesting program, while mutually communicating with said server function; and a count function counting and accumulating a reference total of the requested hypertext document for a reference path based on the reference path including a reference start and a reference destination, concerned with an activated hyperlink of the requested hypertext document, provided by an informing program at the client processor.

28. The computer program as recited in claim 27, wherein said count function counts and accumulates reference totals of the hypertext document for each predetermined time interval of a series of a predetermined number of successive time intervals.

29. The computer program as recited in claim 28, further comprises:

a count condition setting function setting count conditions including, at least, a predetermined duration of each time interval and a predetermined number of the successive time intervals of each series.

30. The computer program as recited in claim 29, further comprising:

a selection function setting count conditions by selecting the count conditions as being common to the program for counting reference totals as being independent for each hypertext document, or as being independent for each reference path of the requested hypertext document.

31. A computer program, embodied in a computer-readable medium, counting reference totals in an interactive hypertext document reference system, comprising:

a server function managing hypertext documents, each hypertext document including at least one hyperlink;

a client function requesting a hypertext document, through a requesting function, while mutually communicating with said server function and including an informing function for informing of a reference path including a reference start and a reference destination, concerned with an activated hyperlink of the requested hypertext document; and a count function counting and accumulating a reference total of the requested hypertext document for each reference path, on the basis of the reference path informed by said client function.

32. The computer program as recited in claim 31, wherein said count function counts and accumulates the reference totals of the hypertext document for each predetermined time interval of a series of a predetermined number of successive time intervals.

33. The computer program as recited in claim 32, further comprises:

a count condition setting function setting count conditions including, at least, a predetermined duration of each time interval and a predetermined number of successive time intervals of each series.

34. The computer program as recited in claim 33, further comprising:

a selection function setting count conditions by selecting the count conditions as being common to the program for counting the reference totals, as being independent for each hypertext document, or as being independent for each reference path of the requested hypertext document.

35. The computer program as recited in claim 31, wherein said informing function is transferred together with the requested hypertext document when said client function requests the hypertext document.

36. The computer program as recited in claim 31, wherein said informing function is previously incorporated in said client function.

37. A frequency counting apparatus, comprising:

a server managing a plurality of hypertext objects, each of the objects including at least one hyperlink;

a client processor referencing to at least one of said hypertext objects, through a referencing program, while communicating with said server; and a count program counting and accumulating a frequency total indicating a frequency of a reference path based on the reference path including a reference start and a reference destination, concerned with an activated hyperlink of the referred hypertext object, provided by an informing program at the client processor.

* * * * *